United States Patent
Cordovez et al.

(10) Patent No.: US 8,762,921 B2
(45) Date of Patent: Jun. 24, 2014

(54) APPARATUS AND METHOD FOR OPTIMIZED POWER CELL SYNTHESIZER

(75) Inventors: Juan Cordovez, San Jose, CA (US); James Victory, Chula Vista, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 13/988,814

(22) PCT Filed: Dec. 3, 2010

(86) PCT No.: PCT/US2010/058927
§ 371 (c)(1),
(2), (4) Date: Aug. 5, 2013

(87) PCT Pub. No.: WO2012/074533
PCT Pub. Date: Jun. 7, 2012

(65) Prior Publication Data
US 2013/0311965 A1 Nov. 21, 2013

(51) Int. Cl.
*G06F 17/50* (2006.01)
(52) U.S. Cl.
USPC ............ 716/132; 716/110; 716/133; 716/135
(58) Field of Classification Search
USPC .................................. 716/110, 132–133, 135
See application file for complete search history.

(56) References Cited

U.S. PATENT DOCUMENTS

| | | | | |
|---|---|---|---|---|
| 5,410,170 A | * | 4/1995 | Bulucea et al. | 257/332 |
| 5,821,775 A | * | 10/1998 | Mehta et al. | 326/98 |
| 6,804,809 B1 | * | 10/2004 | West et al. | 716/119 |
| 7,788,196 B2 | * | 8/2010 | Buscema | 706/25 |
| 7,983,889 B2 | * | 7/2011 | Miura et al. | 703/14 |
| 8,042,070 B2 | * | 10/2011 | Culp et al. | 716/56 |
| 8,204,721 B2 | * | 6/2012 | Victory et al. | 703/2 |
| 8,250,506 B2 | * | 8/2012 | Bantas et al. | 716/110 |
| 2009/0070084 A1 | * | 3/2009 | Miura et al. | 703/4 |
| 2009/0283826 A1 | * | 11/2009 | Shea et al. | 257/336 |
| 2011/0054869 A1 | * | 3/2011 | Li et al. | 703/10 |
| 2011/0292964 A1 | * | 12/2011 | Kashyap et al. | 374/101 |

OTHER PUBLICATIONS

Emelyanov et al.; Simulation and Optimization of Power DMOS Transistors Parameters; Electronics Systemintegration Technology Conference, 2006; vol. 1; Publication Year: 2006; pp. 666-670.*

* cited by examiner

*Primary Examiner* — Naum Levin
(74) *Attorney, Agent, or Firm* — Amerson Law Firm, PLLC (57) ABSTRACT

Apparatus for providing semiconductor device with an analysis module to receive device information, a G-function processor producing an ordered relationship representation corresponding to an optimization parameter specification, and a power cell optimizer to produce an optimization parameter from the ordered relationship representation. A method for designing a semiconductor device includes receiving an optimization target specification; receiving an optimization parameter specification corresponding to an optimization parameter; receiving the target parameter; receiving a G-function corresponding to an ordered relationship representation; optimizing the optimization parameter specification as a function of the predetermined G-function; and producing at least one optimized geometric layout parameter (GLP) by the optimizing, wherein the at least one GLP corresponds to an optimized power cell.

7 Claims, 7 Drawing Sheets

APPARATUS AND METHOD FOR OPTIMIZED POWER CELL SYNTHESIZER

BACKGROUND

1. Field of the Invention

The present invention generally pertains to design of ICs containing large power transistors for low loss switching applications. In particular, power cells are designed to achieve low values of on-resistance (RDSon).

2. Related Art

Successful IC (integrated circuit) development for medium, high power, and very high power applications requires power transistors or cells that achieve very low values RDSon. IC applications including but not limited to power conversion, class-D audio amplifiers, power control for PC products, automotive, MEMS and display drivers leverage low RDSon to improve key figures of merit including energy efficiency, switching and conduction power loss, thermal problems, and switching frequency. The voltage levels of the transistors involved typically range from values of 5V to greater than 700V. The RDSon values required can reach into the sub 100 milli-ohm ranges.

In general, the RDSon of a transistor is inversely proportional to the conducting area of a power transistor. The translation into actual design parameters depends on the transistor type. For example, in a Field Effect Transistor, the gate width design parameter increases or decreases the conducting area. The gate width can be given by a product of design parameters such as the width of a single gate and the number of gates placed in parallel. Ultimately, increasing the total gate width decreases the RDSon. Clearly, increasing gate width comes at the expense of increased area consumed by a power transistor in an IC, ultimately increasing the size of the IC. The cost to fabricate an IC is directly proportional to the size of an IC. Therefore, designing power cells to achieve an RDSon design specification in the smallest area possible is an important factor in reducing IC fabrication costs.

A complicating factor in power cell design is the metal routing or interconnect that provides access to and networks the intrinsic transistors. The total RDSon of a power cell contains resistance contributions from the intrinsic transistor (Rint) and the metal interconnects (Rmetal). As previously stated, the total RDSon of a cell decreases as the gate width and, hence, device area increases. Typically, the intrinsic transistor resistance Rint decreases as the device area increases. By contrast, as the cell area increases, the metal interconnects resistance Rmetal increases. The resistance of a metal interconnect generally is proportional to the length of the metal interconnect, Lmetal, which in turn is proportional to the device area. Therefore, the resistance of the metal interconnects, Rmetal, increases as the device area increases. Equations (1) through (3) provide a high level analytical description of RDSon as a function of cell area.

$$RDSon = Rint + Rmetal \quad (1)$$

$$Rint \propto 1/Area \quad (2)$$

$$Rmetal \propto Lmetal \propto Area \quad (3)$$

Clearly, the two components of RDSon possess generally reciprocal properties, in other words, an increase in cell area tends to increase Rmetal while decreasing Rint. When the goal is to minimize RDSon, this circumstance leads to striking a balance between Rint and Rmetal, a non-monotonic problem.

In general, the minimum value for RDSon can be modeled as a global minimum in a multivariate, nonlinear space. However, previously, multivariate nonlinear optimization of parameters, intending to produce a target value for a predetermined figure of merit, has been avoided in favor of more simplistic "tweaks," which may involve numerous iterations from design through fabrication, and which still may not achieve a satisfactory outcome. For example, in the past, much effort has been focused on lowering the impact of Rmetal on RDSon, for example, by determining advantages metal interconnect styles, which may encompass physical, geometrical and connection properties.

Simulation models, for example, SPICE models, have been created to account for the resistance contributions from the intrinsic transistor (Rint) and the metal interconnects (Rmetal). These models typically calculate metal resistance contributions by implementing simple device formulations based on lumped calculation of metal resistance from a variety of geometrical input parameters and, usually, uniform sheet resistivities p.

Typically, a designer manually chooses geometric layout parameters with limited to no guidance on the inherent layout parameter effects on device performance, for example, as measured by figure of merit, an RDSon-Area product. At present, most power cell design methodologies are based on the cause and effect design or, in some instances, feed forward design, where power device geometrical parameters being determined iteratively to produce a target silicon-characterized RDSon specification within a selected set of constraints.

Also, some optimization methodologies employ massive look-up tables having an exhaustive set of pre-calculated "optimized parameters." These look-up tables typically are derived by brute force optimization analyses for permutations of device geometries, design rules, device power capability, parasitic or intrinsic resistance, capacitance, or inductance, and an array of other device parameters and Figures of Merit (FOM). While an impressive feat, such data sets tend to use significant economic, personnel, training, and infrastructure resources to develop, to maintain, and to update and adapt. A comprehensive optimization look-up table also tends to be cumbersome and inherently inertial, reducing a design team's ability to meet the rapidly changing requirements and short product cycles.

Moreover, a look-up table is a quantized, open-form solution using a collection of data points which, by their nature, are applied as an approximation to an actual target value, unless the data truly coincides with the actual target value. When applied to a problem seeking a global minimum, a look-up table may not find the true minimum. As the number of parameters and ranges of parameters in dimension and scope, there is a greater likelihood of a quantization error-type of imprecision of the data, which lead away from the global minimum.

Overall, these methodologies contain shortcomings that can lead to overdesign, increased costs, and longer design times. In an example of overdesign, an IC designer may attempt to compensate for potential methodology inaccuracies by increasing the device design area, resulting in a power device that consumes unnecessary area and hence increased IC cost. Because of these inaccuracies, real or perceived, an IC designer may spend additional design time to use brute-force design iterations, and to analyze the results from each of the corresponding intermediate silicon iterations. Increased design time may carry heavy penalties, including higher development resource costs. Further, increased silicon iterations can translate into increased silicon costs, increased testing costs, and increased human resource costs. Perhaps the heaviest burden of increased design time or silicon iterations is loss of market share due to delay in time to market, and higher product costs.

Quite often, optimization of power MOSFET parameters is closer to an art, relying on empirically-derived techniques, simplistic models, rules of thumb, corporate tribal knowledge, design methodology preferences, vendor suggestions, or ad hoc trade-offs, which are applied iteratively and, frequently, after fabrication of wafers including power MOSFET-bearing devices. The artful optimization of power MOSFETs may not timely realize optimization targets and may be limited due to pragmatic considerations, including development costs and fabrication facility availability. There is a need for an elegant, compact, closed-ended analytical method and apparatus capable of identifying an optimum value for a target parameter, and of manipulating other parameters having influence the target parameter to produce a device configuration capable of efficiently realizing, in functional silicon, the optimum value for a target parameter.

SUMMARY

Embodiments presented herein provide apparatus and methods for providing an semiconductor device. Apparatus can include an analysis module configured to receive information pertaining to the semiconductor device, a G-function processor coupled to the analysis module, and a power cell optimizer coupled to receive the ordered relationship representation from the G-function processor. A method for designing a semiconductor device is provided including receiving an optimization target specification; receiving a target parameter specification corresponding to an optimization target value corresponding to the optimization target specification; receiving by a power cell optimizer the optimization target specification, and at least one of the a target parameter specification; receiving a G-function corresponding to an ordered relationship representation among the optimization target specification, at least one of the target parameter specification, or the at least one geometric layout parameter; optimizing the at least one of the target parameter specification as a function of the predetermined G-function; and producing at least one optimized geometric layout parameter (GLP) by the optimizing, wherein the at least one GLP corresponds to an optimized power cell.

BRIEF DESCRIPTION OF THE DRAWINGS

The invention is generally shown by way of reference to the accompanying drawings in which.

In the figures, which are not drawn to scale, like numerals refer to like features throughout the description.

DETAILED DESCRIPTION OF THE EMBODIMENTS

Embodiments of the present invention described herein provide a apparatus and method for optimized power cell synthesis. The apparatus and method employ compact analytical equations to accurately predict an optimization parameter value and to generate target parameter values which provide a power cell producing the optimization parameter value, when realized in silicon. Predictive optimization includes the effects of parasitic metal resistance and its variability with device layout. Analytical formulations can provide a closed-form solution that, when used judiciously, can find a global minimum in a continuous solution space. Compact analytical equations provide a representation of an ordered relationship among equation terms, which can describe a semiconductor device characteristic, and which can be exploited to optimize or to solve complex systems described by the analytical equations.

These models typically employ a small number circuit of elements, and are computationally efficient. At the same time, the models still are able to accurately predict the dependence of metal de-biasing on device design parameters such as gate width, number of gates and pad placement. By the addition of a few resistors in series with the source and drain terminals of a subcircuit representing the intrinsic LDMOS device, the models are capable of predicting a preselected performance parameter. In applications of the models, the present embodiments provide compact, closed-ended optimization techniques that tend to be amenable to implementation in hardware, in software, or in a combination of hardware and software. Furthermore, such implementations can be realized as a stand-alone system, or can be integrated into existing design, simulation, and layout systems. The models can be used in conjunction with open-source, commercial, or custom optimization routines. In application, the models can be used to manipulate or transform device parameters with the goal of optimizing a target semiconductor device parameter. Models also may produce one or more configurable device parameters, such as a geometric layout parameter, that describes a physical circuit.

The models can receive one or more device parameters, which may include a physical property representation, and can predict the value of the one or more device parameters corresponding to a preselected optimized target parameter. The one or more device parameters may be used during semiconductor device manufacturing to fabricate a physical device capable of exhibiting an improved characteristic by operating at the preselected optimized target parameter, within a predetermined target parameter value range. For example, methods and apparatus embodiments can produce geometric layout parameters for a power cell that produce a predicted value of RDSon when the power cell is fabricated in a physical device.

The apparatus and the methods can take as input a selected metal interconnect style, or set of styles, for a given power device topology. A designer may interactively input the optimization parameter specification, such as the RDSon specification, through a GUI or a component description format (CDF), within a process design kit (PDK) environment or web based environment to the power cell synthesizer (PCS).

In the interests of concision and clarity, TABLE 1 provides a brief description of pertinent acronyms, which may follow:

TABLE 1

| ACRONYM | DESCRIPTION |
| --- | --- |
| AA | Device Active Area |
| CDF | Component Description Format |
| D | Distributed Effects Constant |
| FOM | Figure of Merit |
| GLP | Geometrical Layout Parameters |
| LC | Layout Constraints |
| lcell | Unit Cell Dimension |
| LG | Layout Generator |
| Lmetal | Length Of Metal Interconnect |
| Mn | $N^{th}$ METAL LAYER (M1, M2, M3, M4, ... Mn) |
| MLS | Metal Interconnect (Layout) Style |
| NG | Number Of Gate Polysilicon Straps Or Fingers |
| OPT | Selected Multivariate Numerical Optimizer |
| PCELL | Parameterized Layout Cell |
| PCO | Power Cell Optimizer |
| PCS | Power Cell Synthesizer |
| PDK | Process Design Kit |
| PS | Pad Spacing |
| rm1d | M1 Contribution To Rmetal For Drain |
| rm1s | M1 Contribution To Rmetal For Source |
| RDSon | Drain-To-Source On Resistance |
| SMDL | Spice Simulator Implementing A G-Function Set |
| SPICE | Simulation Program With Integrated Circuit Emphasis |
| TM | Top Metal Layer |
| WG | Width Of Gate Polysilicon Straps Or Fingers |
| Wmetal | Width Of Metal Interconnect |

As used herein, the term physical property includes, but is not limited to, material composition, film thickness, film sheet resistivity, and contact resistance. Material composition is a chemical composition of a metal layer, which may include but not limited to Al, Cu, Al—Cu alloys, poly-silicon, and tungsten. The metal layer may be drawn in different geometrical shapes including, but not limited to. rectangular, triangular or saw tooth, checkerboard, and circular to take advantage of current density distribution across a power device. Multiple metal layer schemes can be employed to improve connectivity, lower effective resistance through metal layer stacking, and improve robustness to reliability issues such as electro-migration, self-heating, and localized regions of high current flow. A physical property also may include a length, a width, a depth, a thickness, or a horizontal or vertical spacing of a metal layer, a dielectric layer, a semiconductor layer, a device, or an interconnect.

Figure 1A:
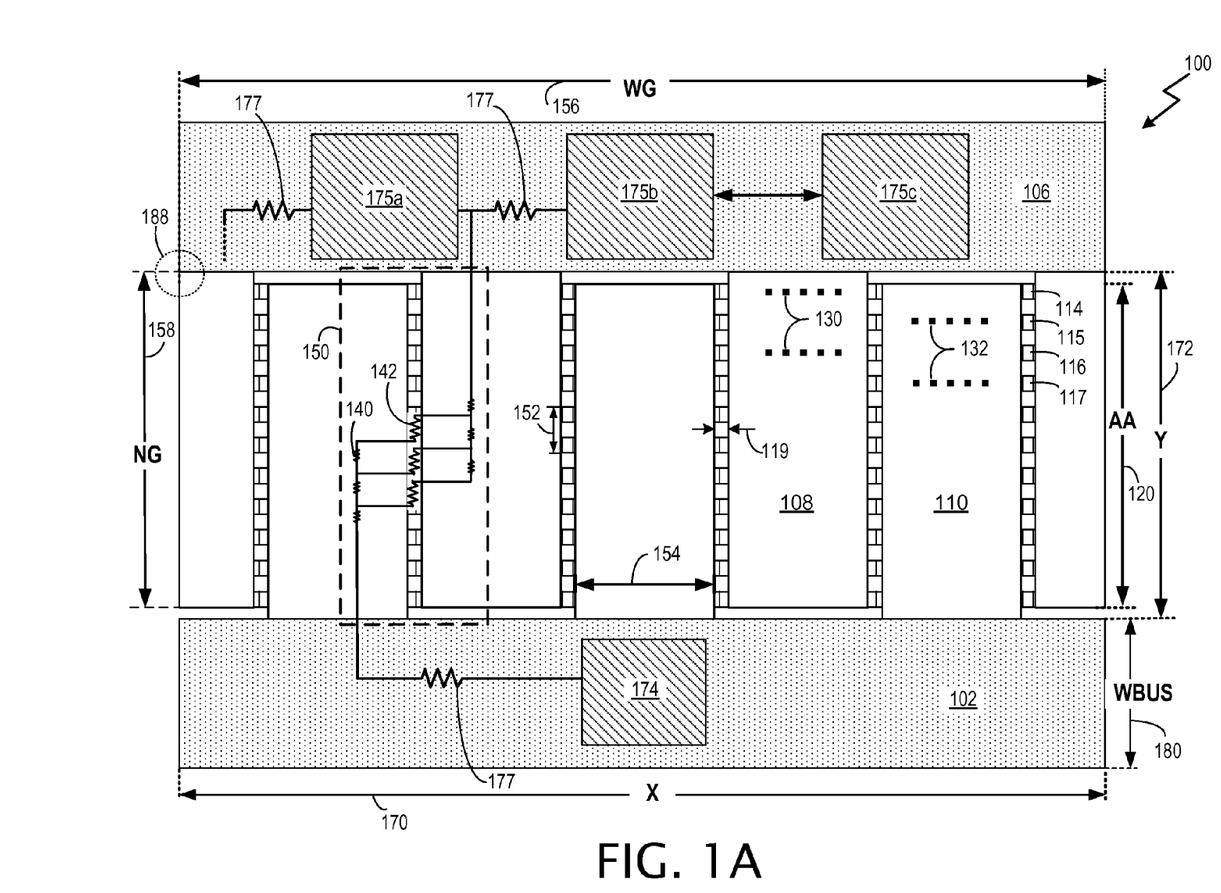
FIG. 1A is an illustration of a portion of an LDMOS transistor depicting geometric parameters in accordance with the teaching of the present invention.

Turning to FIG. 1A, MOSFET device 100 can be in the form of an LDMOS power transistor. One or more LDMOS 100 may be constituents of a PCELL which, in itself may be a constituent of a discrete silicon implementation of an integrated circuit (IC chip). LDMOS 100 is a three-terminal device, including a source 102, a gate (not shown), and a drain 106. It is known in the power electronics art to configure power transistors with multiple straps or "fingers" in order to gain efficiencies from the electrical parallelism in such a configuration. In FIG. 1A, the thin, horizontal bars or "stripes" can be representative of metal layer one (M1) fingers; the wider, vertical bars can be representative of top metal layer (TM) fingers, which can be disposed perpendicularly to M1 fingers. Examples of M1 fingers are depicted in FIG. 1A as fingers 114-117; examples of TM fingers are depicted as fingers 108, 110. Typically, source 102 and drain 106 can be formed by respective alternating M1 fingers 114-117, with a layer of gate polysilicon (not shown) being disposed between respective source and drain layers, as would be known by one of ordinary skill in the art. In the example of FIG. 1A, source 102 and drain 106 fingers can be coupled to active area 120 of transistor 100, typically by contact with underlying silicon. Electrical signals may be conveyed into and out of transistor 100 using, for example, connecting vias 130, 132 with a respective TM layer 108, 110 to at least one of each of drain finger 114, 116 or source finger 115, 117.

Thus, FIG. 1 depicts LDMOS 100 with multiple source fingers 115, 117; with multiple drain fingers 114, 116; and with respectively interposed multiple gate fingers (not shown). For the purposes of the present example, LDMOS 100 is shown as a two metal layer system, having metal layer 1 (M1) fingers 114-117 being connected to intrinsic transistor cells disposed at the level of the Active Area (AA) 120. In the present example, M1 fingers 115, 117 are coupled to source 102 terminal, and are interdigitated with fingers 114, 116. which are coupled, in turn, to drain terminal 106. Transistor 100 may be constituted of plural building blocks, which may be designated as "cells." In general, each "cell" may represent an intrinsic active device having an approximate length and width being approximately "lcell" 152 in magnitude, which can include the metal resistance associated with the cell area. Lcell 152 can be described by a distance from a source contact to a drain contact of the corresponding building block cell. The magnitude of lcell 152 can vary along with the inherent device design. As a nonlimiting example, a intrinsic device capable of supporting a higher breakdown voltage can have a larger value of lcell 152 due, in part, to a longer drift region in support of higher breakdown voltage. Second metal layer fingers 108, 110, here identified as "top metal" or TM, are disposed substantially orthogonally to M1 fingers 114-117. Signals to and from M1 fingers 114-117 are transferred to corresponding TM fingers 108, 110 by way of via connections, as represented by drain TM/M1 vias 130 and by source TM/M1 vias 132. Additionally, the value associated with mspacing 119 can represent the minimum spacing desired between adjacent TM fingers 108, 110, for example, as established by a design rule. Also, RBUS 177 can be representative of bus resistance, for example, inherent resistance of source bus 102 or drain bus 106, which can correspond to bus width, WBUS 180. Values of RBUS 177 can be influenced by additional resistance of contacts 174 and 175a-c, respectively.

Figure 1B:
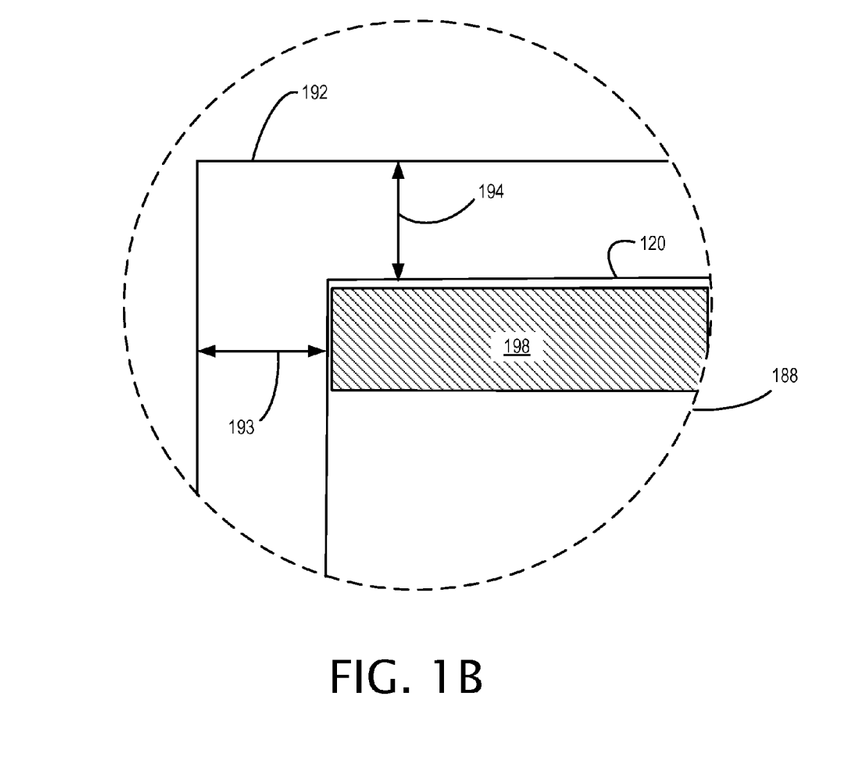
FIG. 1B is an expanded illustration of a portion, Aend, of the LDMOS transistor depicting geometric parameters in accordance with the teaching of the present invention.

FIG. 1B is an expanded illustration of portion "Aend" 188 in FIG. 1A, depicting examples of selected pertinent spacing parameters, relative to Active Area 120. Typically, active area (AA) 120 is formed in well 192, in accordance with pre-defined geometry rules. Spacing parameter AX 193 can be representative of a first distance from an edge of well 192 to AA 120, when viewed in a horizontal plan axis. In addition, spacing parameter AY 194 can be representative of a second distance from an edge of well 192 to AA 120, as illustrated in a vertical plan axis. In general, an active area is known in the semiconductor art as a region of thin oxide on a die or wafer in which transistors and other circuits reside; and a well is known similarly as a localized n-type region on a p-type wafer or a p-type region on an n-type wafer. For purposes of illustration, AA 120 is illustrated with a portion of an M1 finger 198 coupled to substrate corresponding to AA 120. Finger 198 may be representative, for example, of drain M1 finger 114 in FIG. 1A. As generally described in Equation (21) and Equation (22), respectively, parameter AX 193 and parameter AY 194 contribute to dimensions corresponding to device area, as described in Equation (23). Improper characterization of AX 193 and AY 194 can lead to an erroneous values for parameters which include these values, for example, RDSon-Area product.

Figure 2:
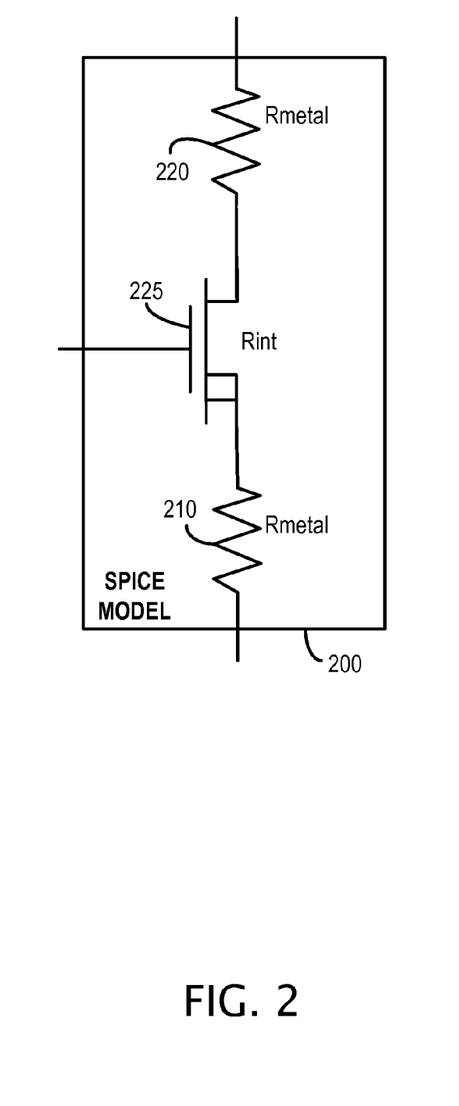
FIG. 2 is a schematic illustration of a SPICE model for RDSon in accordance with the teaching of the present invention.

FIG. 2 illustrates a typical SPICE model 200 for RDSon, in which the source metal interconnect resistance 210 and the drain metal interconnect resistance 220 are idealized as Rmetal, and the intrinsic device resistance 225 is designated Rint. Rmetal 220 can be representative of at least one value of Rmunit 140 illustrated in FIG. 1A, and Rint 225 can be representative of at least one value of Riunit 142. Rint 225 is typically embodied within a SPICE transistor model and Rmetal 220 is embodied in a SPICE resistor components connected in series with Rint 225 at the conducting terminals of the device. Model 200 using just Rmetal 220 and Rint 225 is simple enough to be used in hand calculations. Also model 200 may be implemented as a SPICE compact model, as a SPICE subcircuit, or as a SPICE macro model. Example conducting terminals are drain and source for a FET and emitter and collector for a BjT. Input terminals such as gate for a FET and base for a BjT typically conduct very low currents compare to the conducting terminals. Furthermore, the input terminals are not part of the RDSon series chain, and therefore the resistance associated with metal interconnect is not directly determined here. Even so, in an embodiment, simple formulations based on lumped calculation of metal resistance from geometrical input parameters and sheet resistivities $\rho$ (rho) may be used to calculate metal resistance contributions. Generation of an optimization parameter, in accordance with the teachings herein, may allow even simple formulations to provide acceptable results and insight into the predicted performance of the modeled device.

Returning to FIG. 1A, in an example in which RDSon is used as an optimization parameter, unit intrinsic transistor resistance parameter, Riunit 142, and metal interconnect resistance parameter, Rmunit 140, can be target parameters corresponding to RDSon. Lcell may be between about 1 e-6 to about 10e-6 meters, depending on the intrinsic device design. Multiple cells of resistance Riunit can be connected together as one moves vertically along the source and drain TM fingers by a distance representative of Rmunit. In general, the width of a source or a drain TM bars or fingers can be represented by WD, the total width of gate fingers can be represented by WG, and the number of gate fingers can be represented by NG. A "section" 150 can consist of one entire length of TM fingers or bars, drawn symmetrically in FIG. 1 to encompass about one-half of source TM bar (e.g., TM bar 110) and about one-half of drain TM bar (e.g., TM bar 108). Multiple sections may then be placed in parallel.

In accordance with the foregoing, $$\text{Area} = WG \cdot NG \cdot lcell \quad (4)$$

$$Rmetal = \frac{\rho_{metal} \cdot L_{metal}}{W_{metal}} \cdot \frac{1}{D} \cdot \frac{1}{Nsection} \quad (5)$$

where D can be an empirical or semi-empirical constant to capture the distributed effects. Typical values of D may range from 1 to 12. Area is used as a target parameter when optimizing the parameter, RDSon. The metal resistance reduces with the number of metal bars, or fingers, or stripes, represented by Nsection. The intrinsic device resistance may be given by $$Rint = \frac{Riunit}{WG \cdot NG} \quad (6)$$

Embodiments of the present invention provide an analytical function for the M1 resistance contribution to Rint for the drain (rrd) and for the source (rrs). Likewise, an analytical function is provided for the M1 contribution to Rmetal for the drain (rmld) and for the source (rmls) of the device. Currently, one of ordinary skill in the art would know the respective identities of rrd, rrs, rmld, and rmls, as follows:

$$rrd = \frac{Riunit}{nscm2} \cdot \left[ \frac{(nscm2 \cdot \sqrt{Rm1unit/Riunit})}{\tanh(nscm2 \cdot \sqrt{Rm1unit/Riunit})} - 1 \right] \quad (7)$$

$$rrs = \frac{Riunit}{ndcm2} \cdot \left[ \frac{(ndcm2 \cdot \sqrt{Rm1unit/Riunit})}{\tanh(ndcm2 \cdot \sqrt{Rm1unit/Riunit})} - 1 \right] \quad (8)$$

$$rmld = \left[ \left( \frac{nscm2 + ndcm2}{nscm2 + rrd} \cdot \left( 1 + \frac{\frac{Riunit}{nscm2} + rrd}{\frac{Riunit}{ndcm2} + rrs} \right) \right)^{-1} \right] \quad (9)$$

$$rmls = \left[ \left( \frac{nscm2 + ndcm2}{ndcm2 + rrs} \cdot \left( 1 + \frac{\frac{Riunit}{ndcm2} + rrs}{\frac{Riunit}{nscm2} + rrd} \right) \right)^{-1} \right] \quad (10)$$

where nscm2 and ndcm2 represent the number of intrinsic cells under the source TM and drain TM. Equations (7) through (10) are generalized for the case of asymmetric source TM and drain TM, having width WD. For layout in illustrated in FIG. 1, the TM drain and source metal are symmetric, therefore:

$$nscm2 = ndcm2 = \left( \frac{WD + mspacing}{2 \cdot lcell} \right) \quad (11)$$

The unit resistance for M1 is given by $$Rm1unit = \frac{\rho_{m1} \cdot lcell}{wm1} \quad (12)$$

A model including EQ. 7-12 can account for varied affects, which may be related to factors including, without limitation, the device layout, the underlying device technology, varied intrinsic device and interconnect physical characteristics, sheet resistivity gradients, and multilayer metal architectures. Similar formulations result in equations for the distributed resistance of M2 and subsequent metal layers depending on number of metal layers used in the device. The equations ultimately produce values that capture the total distributed metal resistance, which can be netlisted or stored into the simple resistors 210 and 220 of FIG. 2. Even more elaborate analytical sets of equations or models, which may increase model accuracy, may be used which determine the optimization parameter, e.g., RDSon, based on mathematical and physical analysis of the distributed effects of power devices. The optimization parameter can correspond to an improved characteristic of the device being modeled. In accordance with the teachings herein, analytical functions as described by EQ. 7-12 can be designated as a "G-function." Other analytical and numerical functions can supplement or be substituted for EQ. 7-12. Also, EQ. 7-12 may be a subset of an embodiment of a G-function, pertinent to M1. Typically, a G-function will be provided for each metal layer, out to the contact pads. For an entire device, the plural G-functions will describe a G-system. In general, by optimizing G-function values using a multivariate analysis and optimization program, an optimization parameter may be realized, as well as related device target parameters, which may be correlated with the optimization parameter. The G-function can be an ordered relationship representation that describes a characteristic of a semiconductor device. As an example for the layout of FIG. 1A, a G-function can include dependence on selected GLP as follows:

$$G = f(WG, NG, WD) \quad (13)$$

In general, optimization finds the global minimum of the space defined by the G-function, which tend to be non-monotonic in nature. Gross errors or divergent behavior may result from monotonicity in the G-function. EQ. 13 represents a non-monotonic function, which may include local minima and a global minimum. Another parameter, section resistance, may be described by a system of analytical or numerical formulations which capture the distributed resistance network represented by Rmunit 140 and Riunit 142. Rmunit 140 consists of contributions from all the metal layers in the system. Under the assumption of equipotential boundaries, negligible end effects, and no LC, increasing gate width WG to meet an RDSon specification typically does not result in an increase in RDSon-Area product. Increasing WG effectively places multiple "sections" in parallel where the power device resistance is given by $$RDSon = \frac{Rsection}{Nsection} \quad (15)$$

The number of sections, Nsection, is directly proportional to a value for WG assuming constant value for WD. Decreasing NG can reduce TM finger resistance because the length of the TM finger typically is proportional to the value of NG. Optimization can be achieved, at least in part, by increasing WG while decreasing NG to reach the RDSon in a minimal area. For example, including a layout dimension constraint on X, Y, or X/Y, can provide a boundary condition.

Previously, LDMOS-based models assumed for simplicity that the edges of the active areas in the source terminal 102 and drain terminal 106 were equipotential boundaries. However, these models could introduce monotonicity into the G-function. In embodiments of the present invention, the analytical formulations used for the numerical optimization may include the resistance effects associated with the metal connection buses to the contact or pad locations. The metal bus resistance increases as WG increases, introducing a minima into the G function of RDSon=f(WG).

In practice, contact points or pads are placed along the metal buses, which serve as reference points for RDSon calculation and measurement. If a single pad is placed in the center of the metal bus, providing symmetrical current flow paths along the X direction of the metal bus. For the single pad case, as WG increases, Rbus increases with WG. A simple formulation for Rbus for the single pad case is given by $$Rbus = \frac{\rho_{metal} \cdot WG}{WBUS} \cdot \frac{1}{Dbus} \quad (16)$$

Where a value of Dbus of about 12 takes into account symmetrical and distributed resistance effects. Multiple pads may be introduced in practice, to reduce the metal bus resistance, and hence RDSon, as well as providing a uniform distribution of the current into the pads. In this case, each section resistance is connected in series with bus resistance at the source and drain ends. The total RDSon can be approximated by $$RDSon = \frac{Rsection + 2 \cdot Rbus}{Nsection} \quad (17)$$

However, in such a case, RDSon remains a monotonic function of WG. Even so, in practice, the number of pads, NP, is finite and may constitute a constraint on the system. Given this, the bus resistance is determined from the following system of equations:

$$Rbus = \frac{\rho_{metal} \cdot \frac{PS}{Dbus}}{WBUS \cdot NP} \quad (18)$$

$$PS = WG - NP \cdot WP \quad (19)$$

The total RDSon then becomes:

$$RDSon = \frac{Rsection}{Nsection} + 2 \cdot Rbus \quad (20)$$

Because Rsection/Nsection decreases as a function of WG [f(WG)] and Rbus increases as a f(WG), RDSon=f(WG) can be a non-monotonic function.

Turning next to device area, FIG. 1 illustrates that device area can be a limiting constraint with a clear impact on the RDSon-Area product. Device area can be found by:

$$X = WG + 2 \cdot AX \quad (21)$$

$$Y = NG \cdot lcell + 2 \cdot AY + 2 \cdot WBUS \quad (22)$$

$$Area = X \cdot Y \quad (23)$$

The layout parameter WD, or width of the TM Finger can be important parameters in the G-function. On one hand, as WD increases, the resistance contribution of the TM Finger will decrease due to the increased width of the TM resistance. However, the resistance of the M1 Fingers increases because WD represents M1 resistance length. The width of each M1 finger, wm1, is typically very small compared to WD and therefore, large WD can result in high values for the M1 resistance. Furthermore, the ratio of the TM and M1 sheet resistivities provides a weighting factor to the contributions of M1 and TM to the resistance as a function of WD and wm. The spacing between TM fingers, mspacing, provides an additional optimization criterion. At initial look, as multiple sections are placed in parallel, the total section resistance decreases due to the parallel effect. However, for each section placed in parallel, a necessary metal spacing is placed. As the number of spacings increases, the total TM density decreases. Metal spacing equates to area devoid of current conduction, thus, directly increasing the RDSon-Area product. For analogous reasons, the spacing should be set to the minimum value required to support the applied voltage and is therefore a constraint on the system.

An additional WD issue to account for is the relation of WD, mspacing, and WG. From FIG. 1, the following relationship is derived:

$$WG = (WD + mspacing) \cdot Nsection \quad (24)$$

As Nsection inherently is an integer value, WG/(WD+mspacing) can be an integer, and can be used to represent a numerical constraint implemented in PCO.

As previously mentioned, there is a fixed area at the end of the devices, Aend. In practice, there is a minimum distance between the device AA 120 and the WELL edge 192, given by AX 193 and AY 194 in the X and Y dimensions respectively. Ignoring bus effects, in the limit of WG→0 (zero) and NG→0 (zero), the active area, AA→0 (zero) and thus the device area approaches 4·AX·AY. In this limiting case, the metal resistance→0 (zero) and thus the negative influence of metal resistance on RDSon-area tends to be negligible. However, as Aend 188 becomes a greater percentage of the total area, the RDSon-Area product tends to increase for very small AA 120 or by contrast large RDSon devices. The GLP parameter NG causes the RDSon-Area product to increase with large NG, due to the increased length of TM fingers 108, 110. However, at small NG, the RDSon-Area product also may increase due to increased influence of Aend 188 on the total area. Thus, RDSon-Area product tends to be a non-monotonic function of NG. A similar increase in RDSon-Area product typically occurs with small WG, due to the Aend 188 effects. At large WG, RDSon-Area product may increased due to Rbus effects.

For a given intrinsic device, metal layout style, and layout constraints, multiple GLP value arrays can be determined by the PCO to produce an optimization parameter specification, such as an RDSon specification. Present embodiments can employ numerical optimization of the multivariate system of equations of the G-function to determine a GLP value array producing RDSon specification in a minimum area, subject to at least one constraint, LC.

Figure 3:
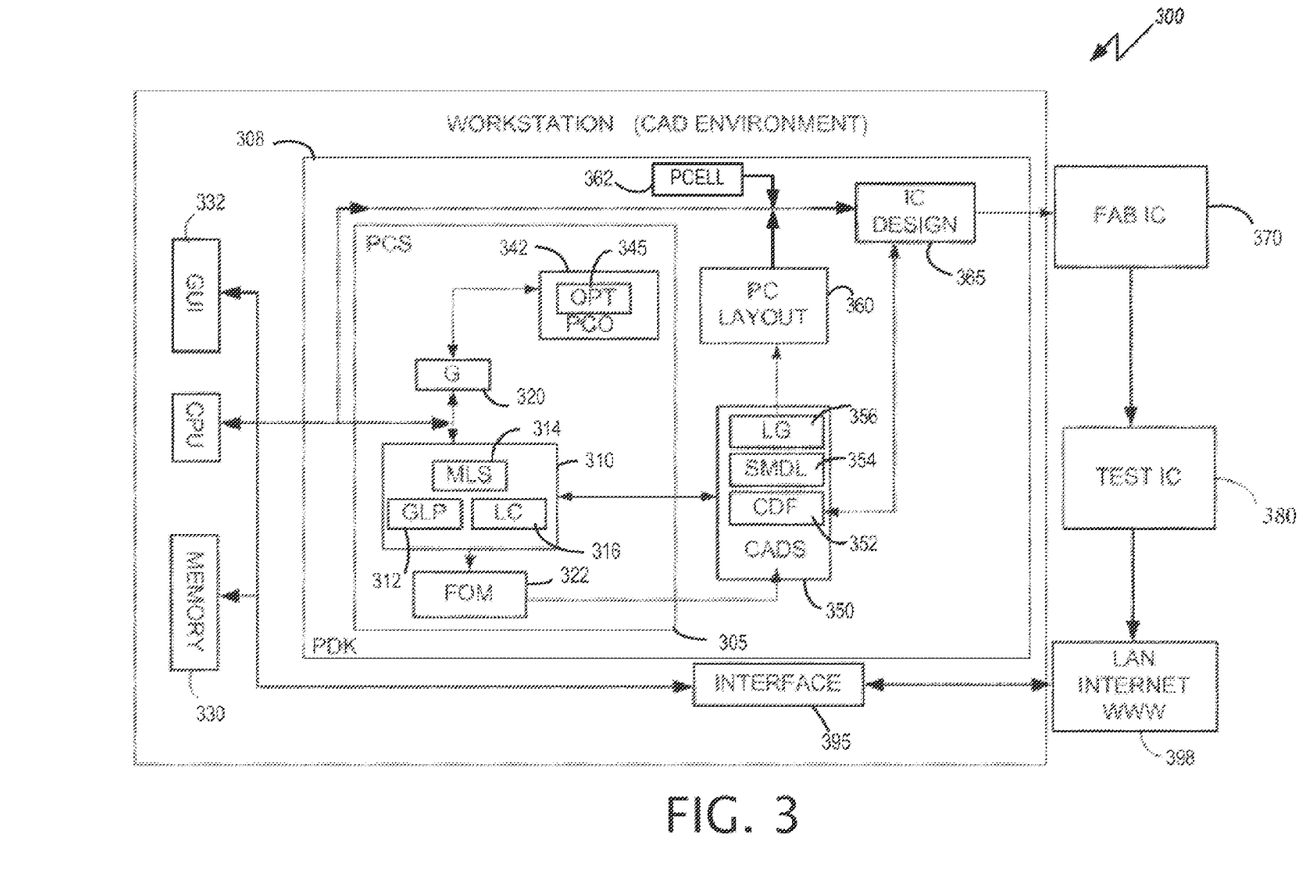
FIG. 3 is a block diagram of a IC design system including an optimizing power cell synthesizer in accordance with the teaching of the present invention.

FIG. 3 depicts an example embodiment of integrated circuit design system 300, which includes therein power cell synthesizer (PCS) 305. Embodiments of PCS 305 are configured to perform RDSon-Area minimization. PCS 305 may be a module of Process Design Kit (PDK) 308. PCS 305 can employ technology analysis module 310 having constituent coupled device technology library modules, including, without limitation, Geometrical Layout Parameter (GLP) library 312, Metal Interconnect (Layout) Style (MLS) library 314, and Layout Constraint (LC) library 316.

TABLE 2 illustrates examples of Geometrical Layout Parameters for a power cell constructed from an LDMOS device.

TABLE 2

| GLP Parameter | Description |
| --- | --- |
| WG | Width of one gate poly stripe |
| NG | Number of gate poly stripes |
| WD | Width of top metal finger |

TABLE 3 illustrates examples of Layout Constraints.

TABLE 3

| LC Parameter | Description |
| --- | --- |
| WBUS | Width of connection bus |
| WP | Width of contact pad |
| NP* | Number of contact pads |
| PS* | Spacing between contact pads |
| XMAX | Maximum value for X dimension |
| YMAX | Maximum value for Y dimension |
| Y/X MIN | Minimum value for Y/X Ratio |
| Y/X MAX | Maximum value for Y/X Ratio |
| mspacing | TM spacing, typically set by design rules in combination with breakdown voltage requirements |
| wm | Width of M1 fingers typically set by intrinsic device level contact design rules. |

Parameters NP and PS also may be included as GLP.

Analysis module 310 can communicate with G-function processor (GFP) 320 and Figure-of-Merit analysis (FOM) module 322. Information pertaining to the semiconductor device to be optimized may be maintained in storage memory 330 and communicated with PCS 305 and analysis module 310. Also, an IC designer using system 300 may provide to and receive from PCS 305, using GUI 332, information pertinent to the semiconductor device to be optimized. GFP 320 can incorporate a set of physically based formulations referred to as G-functions that predict a target parameter, such as RDSon-Area performance, as a function of device properties. GFP 320 can determine an optimized value of GLP, for example, to produce an RDSon in the smallest area for a given MLS, or an optimized value for an RDSon-Area product. Another embodiment can employ OPT 345 to perform numerical optimizations for RDSon in a smallest area across multiple MLS, determining which MLS produces an RDSon in the smallest area. Once optimized MLS and GLP are determined, GLP information can be used to generate a distributed network representation, providing discrete voltage and current electrostatic information across the layout, and realized as a discrete netlist. The distributed network representation may be in the form of SMDL 354, which also may generate a netlist of the discrete simulation information. Discrete netlist information also may be used to check points for potential reliability problems. If the netlist analysis indicates that potential errors or problems exist, then an additional constraint may be added and iteration through PCS 305 may be repeated. The power cell synthesis using PCS 305 may be generated in conjunction with a parameterized layout cell, commonly referred to as PCELL 362. A PCELL typically is provided with PDK 308.

Information processed by GFP 320 may be received by analysis module 310 and communicated with FOM 322 so that a preselected FOM may be calculated from the information. If an unsuitable FOM is produced by FOM 322, the FOM is fed back into analysis module 310 to effect additional optimization of power cell target parameters. In addition, GFP 320 may be communicatively coupled with Power Cell Optimizer (PCO) 340 employing an optimizer (OPT) 345, such as a multivariate numerical optimizer. Information processed by GFP 320 can be communicated with PCO 340 for optimization of selected data in the information. When the selected data has been optimized by OPT 345, the conditioned information may be communicated to the IC designer by way of GUI 332, and to FOM 322, to computer aided design subsystem (CADS) 350, or to both.

CADS 350 can receive information from PCS 305 and can format the received information using Component Description Format (CDF) module 352 into, for example, a standardized format such as a CIF format or a GDSII format, and also may generate SPICE simulator input decks from the received information. SPICE model (SMDL) module 354 can receive SPICE simulator input decks for device simulation and analysis. SMDL 354 can perform a simulation, for example, of a semiconductor device, and can generate simulation data in accordance with the simulated device behavior. In present embodiments, SMDL 354 also may be configured with G-functions, so that device simulation also can be analyzed by an optimization processor that converges to optimized target or performance parameters. Alternatively, when PCS 305 completes finding optimized GLP values, the GLP values are passed to G-function processor 320, which calculates values for source and drain metal resistance. These resistance values can then be passed, or sent as a netlist, to the Rmetal analog resistor components of SMDL 354. Typically, Rmetal has a default value. PCS 305 can pass a calculated Rmetal value from the G-function based on optimum G-function. In this way, SMDL 354 may be kept simple, e.g., without the need to show G-function equations. SMDL 354 receives the G-function "values" for the Rmetal such that the full accuracy of simulation is retained, compared to an realization of SMDL 354 with the G-functions fully implemented.

Optimized parameters may predict performance of the simulated device when implemented in silicon. PCS 305 can communicate optimized information from SMDL 354 to CDF module 352, which can send corresponding formatted data to Layout Generator (LG) 356, which can generate a device layout having geometrical features approaching or realizing optimized target variables. In general, LG 356 may generate a semiconductor layout representation corresponding to the simulated device behavior having the improved characteristic PCS 305 may pass values to CDF module 352 which, in turn, may pass a netlist of GLP and Rmetal values to SMDL 354. CDF module 352 also may pass GLP information to PCELL 362 or LG 356 for layout generation. The optimized target variables can be representative of a global minimum error, which Power Cell (PC) layout module 360 can use to generate a power cell device layout predictive of optimized performance.

An optimized power cell functions within the operational context of an integrated circuit (IC). Accordingly, optimized power cell information can be communicated to IC design module 365 so that one or more optimized power cells may be designed into an integrated circuit under design. IC design module 365 also may perform IC simulations to assess the functionality of the IC under design, including the one or more optimized power cell. It may happen that a power cell design may degrade the overall performance of the IC during IC simulation, relative to predetermined IC specifications. Power cell optimization feedback may be provided by IC design module 365 back to CADS 350, which may further optimize the power cell under design within the operational context and specification of the IC under design.

Acceptable simulation results of the IC in IC design module 365 can allow tape out of the IC design to the fabrication facility 370. After fabrication, IC wafers formed with the IC design can be tested in test facility 380. Test results can be fed back to PCS 305 by communicating over a communication network, for example, the Internet, with interface 395 of system 300. Test results can be used, for example, by PCS 305, by SMDL 354, or by both, to analyze operational IC information to identify potential reliability problems, including, without limitation, electromigration, localized current "hot spots," or other information indicative of decreased product reliability. With this information, PCS 305 may be able to further optimize a power cell design and layout for implementation in an IC circuit.

OPT 345 can be implemented using an open source or a commercial optimization module, which module also may cooperate with simulator SMDL 354. Examples of such a module include, without limitation, an ALGENCAN module, an ASCEND module, an IPOPT module, or an L-BFGS module. Moreover, each of these modules can be modified by one skilled in the art to cooperate with a numerical simulator, such as a MATLAB® simulator, or a SPICE simulator. Furthermore, custom systems may be developed, for example, in FORTRAN, C, C++, JAVA, or another programming language, to provide an aforementioned module in the context of a stand-alone simulation system.

ALGENCAN is a general nonlinear programming module that does not use matrix manipulations and is able to solve extremely large problems with moderate computer time. The general algorithm is of Augmented LaGrangian type, and the subproblems are solved using GENCAN. GENCAN (included in ALGENCAN) is a FORTRAN code for minimizing a smooth function with a potentially large number of variables and box-constraints. ALGENCAN is an open source optimization module that can be obtained from the MathWorks (Natick, Mass.) website at URL: http://www.mathworks.com/matlabcentral/fileexchane/14260-tango-project-algencan, or from Trustable Algorithms for Nonlinear General Optimization (TANGO) Project—ALGENCAN at the University of Sao Paolo, Brazil at URL: http://www.ime.usp.br/~egbirgin/tango/.

ASCEND is an object-oriented computer environment for modeling and analysis. It is available as open source software is available through the SourceForge open source software development web site, operated by GeekNet, Inc., Mountain View, Calif. USA, at URL: http://sourceforge.net/projects/ascend-sim/, and through Carnegie-Mellon University, Pittsburgh, Pa. USA, http://ascend.cheme.cmu.edu/.

IPOPT (Interior Point OPTimizer) is a software package for large-scale, nonlinear optimization. IPOPT is available, for example, from The Computational Infrastructure for Operations Research, The COIN-OR Foundation, Inc., Arlington Heights, Ill. USA at URL: https://projects.coin-or.org/Ipopt/browser.

L-BFGS is a quasi-newton limited memory and Steepest decent optimizer for large amount of unknowns. L-BFGS also is open source, available from the *NEOS Server of Optimization*, hosted by the U.S. Department of Energy, Argonne National Laboratories, and Northwestern University, at URL: http://www.eecs.northwestern.edu/~nocedal/Software/lbfgs_um.tar.gz.

A suitable commercial high-level technical computing language and interactive environment for optimization in accordance with the teachings herein includes MATLAB®, produced by The Mathworks, Inc., Natick, Mass. USA, which may be used in conjunction with other modules of the MATLAB® Product Family, including, for example, Optimization Toolbox. However, ALGENCAN, ASCEND, IPOPT, and L-BFGS also each are capable of interfacing with MATLAB® to perform multivariate non-linear variable optimization, as well as being used with a custom design environment. Furthermore, ALGENCAN, ASCEND, IPOPT, L-BFGS, and the MATLAB® products may be adapted to operate within a SPICE simulation environment to allow the additional non-linear optimization functions brought by one of these products to enhance SPICE functionality. In an example of OPT 345 operation, a target parameter value may be assigned for RDSon, and OPT 345 may perform a non-linear multivariate numerical optimization, for example, using one of the aforementioned optimization modules, on input geometric layout information in search of optimized values of GLP to produce a target parameter value RDSon in a smallest area corresponding to a selected metal interconnect layout style, that is, the minimal RDSon-Area product.

Figure 4:
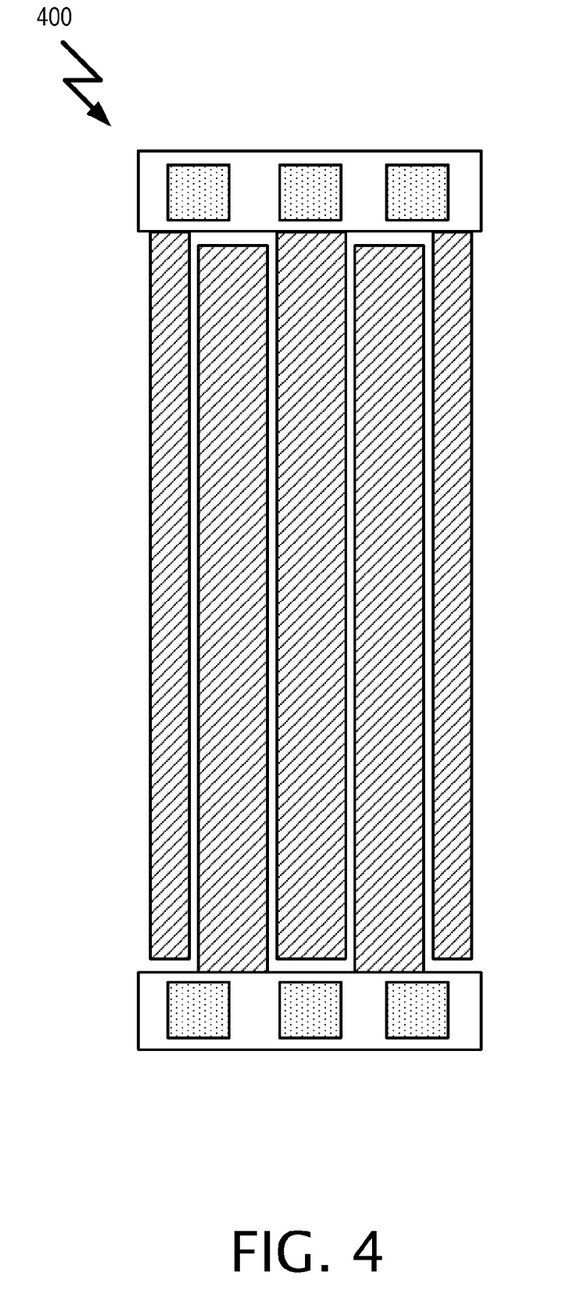
FIG. 4 is a graphical illustration of a portion of a LDMOS transistor layout, employing a previous geometric layout parameter selection technique.

TABLE 4 provides an example comparison of GLP parameter values determined through optimization in accordance with embodiments herein (POINT A) and a manually-selected GLP parameter values (POINT B). Both devices are subject to a 3-pad contact constraint. The GLP parameter values also are compared along with corresponding target parameter values of RDSon, and area, in which a 12% reduction in area is realized. FIG. 4 is an illustration of a layout generated using a prior technique to match point B GLP parameter values. For simplicity of exposition, only TM, the connection buses, and contact pads are shown.

Figure 5:
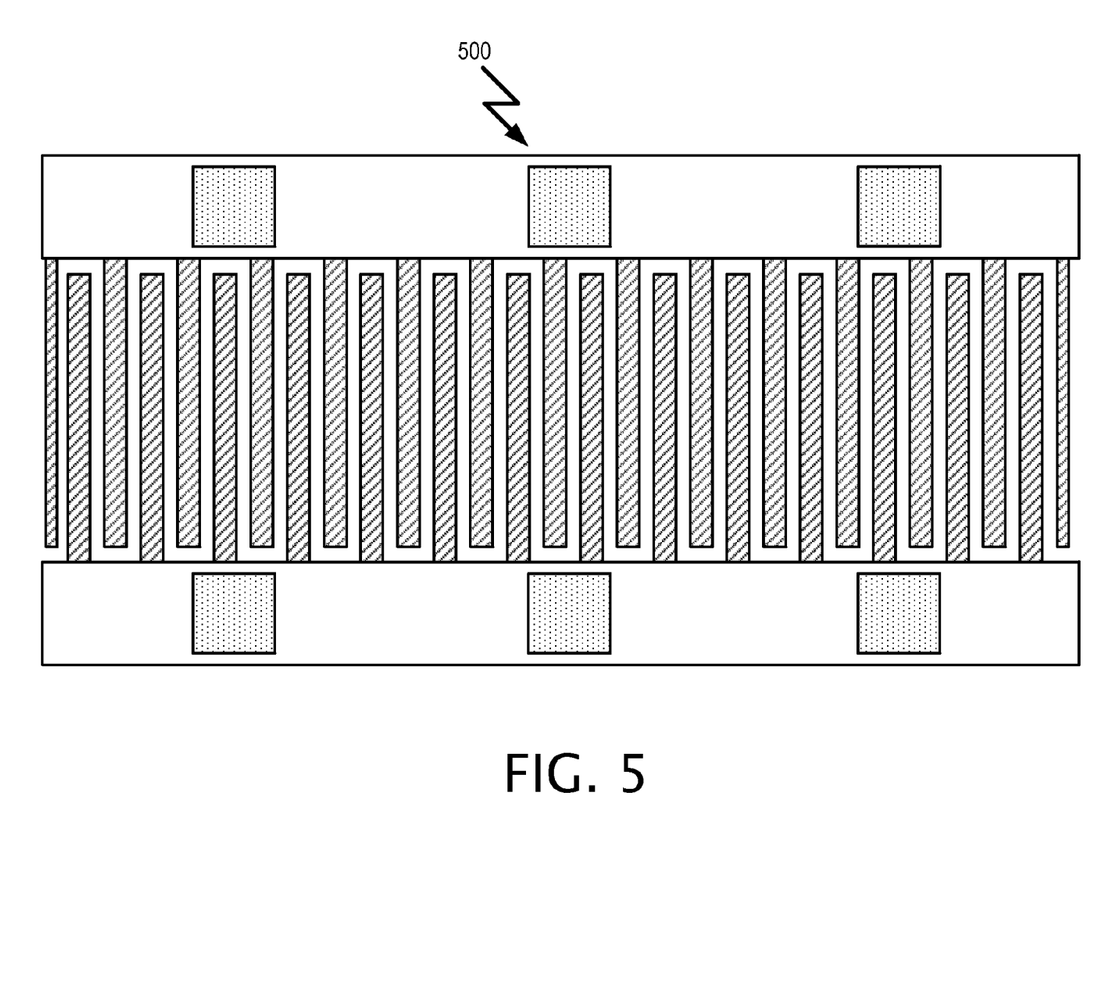
FIG. 5 is a graphical illustration of a portion of a LDMOS transistor layout employing geometric layout parameter selection, in accordance with the teaching of the present invention.

FIG. 5 is an illustration of a layout generated using optimization as taught herein, in which a Layout Generator produces the layout based on the GLP parameters output by PCO. Optimization generally shortens the TM lengths by decreasing NG. At the same time, WG is increased until the bus resistance begins to have a significant impact on RDSon. Additionally, the influence of M1 resistance is reduced by using narrower TM widths.

TABLE 4

| Parameter | PCS Selection "A" | Manual Selection "B" |
|---|---|---|
| WG [um] | 860 | 340 |
| NG | 50 | 143 |
| WD [um] | 30 | 85 |
| RDSon [Ω] | 0.25 | 0.25 |
| Area [um$^2$] | 263076 | 299267 |

Figure 6:
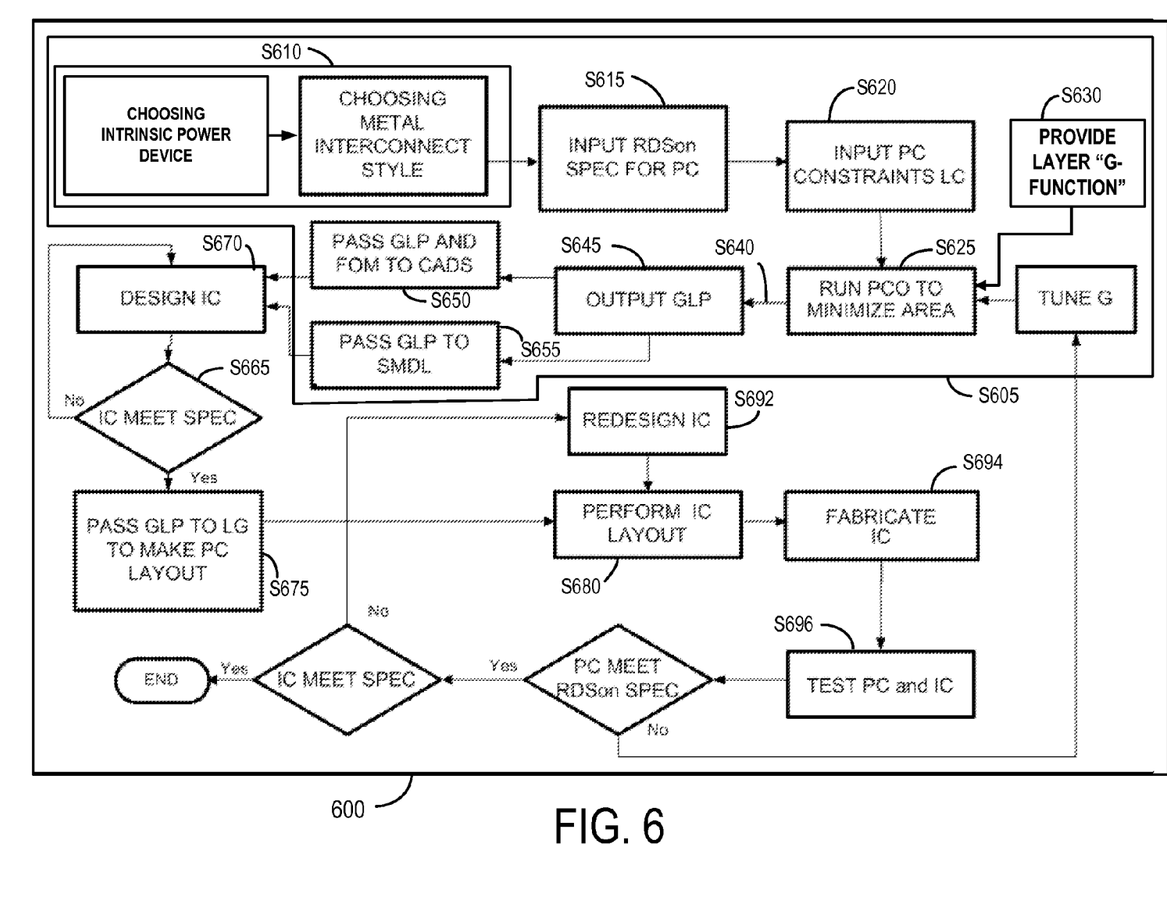
FIG. 6 is a block flow diagram of a method for an optimized IC design process, including optimizing power cell synthesis, in accordance with the teaching of the present invention.

Turning now to FIG. 6, example embodiments of an optimized IC manufacturing process 600 are described. Process 600 can employ predictive power cell design process 605, using multivariate optimization, such as optimization performed by PCO 340 in FIG. 3. PCO 340 may be a constituent of PCS 308. In general, process 600 can include receiving (S610) at least one target parameter; receiving (S615) a optimization parameter specification corresponding to an optimization parameter; and receiving (S620) layout constraints (LC) for the power cell.

Continuing, method 600 can proceed by receiving (625) the optimization parameter specification, and at least one of the a target parameter specification, or LC, by a power cell optimizer; receiving (630) a predetermined G-function corresponding to a physical geometry of a power cell; optimizing (635) at least one of the a target parameter specification, or LC, as a function of the predetermined G-function; and producing (S640) at least one geometric layout parameter (GLP) by the power cell optimizer, wherein the at least one GLP corresponds to an optimized power cell.

Receiving (S645) the at least one geometric layout parameter (GLP), and determining (S650) a Figure-of-Merit (FOM) from the at least one GLP by an FOM calculator gives design feedback from PCS 308. Also receiving (S655) the at least one GLP can be a SPICE model simulator (SMDL), for simulating (S660) the optimized power cell corresponding to the at least one GLP. By analyzing (S665) SMDL output values, SMDL may continue by iterating (S670) optimization until target specifications are met, or may pass to PCS 305 optimized information for passing to CDF module 352, which can send corresponding formatted data to Layout Generator (LG) 356. Performing (S680) a power cell layout having geometrical features, approaching or realizing optimized target variables, implements a potentially optimized power cell. A G-function can correspond to an ordered relationship representation among two or more of the optimization parameter specification, at least one target parameter, or a geometric layout parameter.

Integrating (S685) at least one power cell layout into a integrated circuit layout by an IC design system can place the power cell into its operational context, where analyzing (S690) IC simulation performance can determine whether the power cell merits iterating (S692) on the power cell design to improve performance, or submitting (S694) the IC design information to a fabrication facility for test wafer preparation. Testing (S696) of the test wafer generates test data, and feeding back (S698) test data to PCS 310 determines whether, and at what point, iterating optimization is indicated, for example at optimizing (S635). Receiving (S610), (S615), (S620), (S625), and (S630) may be implemented using a graphical user interface (GUI), a component description format file (CDF), or both a GUI and a CDF. Iterating (S692) may be merited if the power cell test target data does not meet the optimization target value, within a predetermined tolerance range.

Other embodiments of the present invention may be useful in applications including, without limitation, providing breakdown voltage BV scaling in intrinsic transistor cell lateral scaling; or determining optimal layouts to minimize reliability issues. Pertaining to breakdown voltage BV scaling, the transistor unit cell resistance or dimension may become a function for optimization of the input BV, which may be introduced into a G-function. Alternatively, the resistance and BV may become a function of the cell dimension.

Pertaining to determining optimal layouts to minimize reliability issues such as electromigration, current hot spots, and self-heating, G-functions can be suitably modified to optimize over a preselected reliability criterion. By providing an optimization parameter specification, for example, current density J or self-heating does not exceed a predetermined optimization parameter value at any point in the layout, within a predetermined error range. Accordingly, suitably modified G-functions can be employed to optimize target parameters, such as metal finger widths, bus widths, or pad locations, so the current density or self-heating may be maintained within the predetermined error range of the predetermined optimization parameter value.

The goal of the PC design process is to achieve the silicon characterized RDSon optimization parameter specification within the criteria of (1) minimal device area; (2) minimal design time; and (3) minimal silicon fabrication cycles. These criteria can be directly related to the cost associated with design of the power device and the encapsulating IC. In general, the accuracy of the predictive G-functions can influence the effectiveness of power cell design. Furthermore, SPICE model accuracy can be influenced by the accuracy of the model to capture the resistance contributions from the intrinsic transistor (Rint) and the metal interconnects (Rmetal).

While the invention has been described in terms of various specific embodiments, those skilled in the art will recognize that the invention can be practiced with modification within the spirit and scope of the claims.

What is claimed is:

1. An apparatus for providing a semiconductor device, comprising:
   an analysis module configured to receive information pertaining to the semiconductor device,
      wherein the information includes an optimization parameter specification corresponding to an optimization parameter and at least one target parameter corresponding to the optimization parameter, and
      wherein the at least one target parameter also corresponds to a physical dimension of the semiconductor device and the physical dimension corresponds to a geometric layout parameter;
   a G-function processor coupled to the analysis module,
      wherein the G-function processor is configured to receive at least one of the optimization parameter specification, the at least one target parameter, or the geometric layout parameter, and
      wherein the G-function processor formulates an ordered relationship representation between two or more of the optimization parameter specification, the at least one target parameter, or the geometric layout parameter and the ordered relationship representation describes a characteristic of the semiconductor device; and a power cell optimizer coupled to receive the ordered relationship representation from the G-function processor, wherein the power cell optimizer includes an optimizer module and the optimizer module transforms the ordered relationship representation to correspond to the optimization parameter and wherein the optimizer module is a multivariate optimizer, the ordered relationship representation is formed so at to be non-monotonic, and wherein the optimization parameter corresponds to a global error minimum in a solution space defined by the ordered relationship representation, and wherein the optimization parameter corresponds to an improved characteristic of the semiconductor device.

2. The apparatus of claim 1, wherein the ordered relationship representation is formed to be non-monotonic.

3. The apparatus of claim 1, wherein the power cell optimizer module transforms at least one target parameter and wherein when a transformed target parameter modifies fabrication of the semiconductor device, the semiconductor device exhibits the improved characteristic.

4. The apparatus of claim 3, wherein the optimizer module is a multivariate optimizer, the ordered relationship representation is formed to be non-monotonic, and wherein the optimization parameter corresponds to a global error minimum in a solution space defined by the ordered relationship representation.

5. The apparatus of claim 4, further comprising a semiconductor device simulator coupled to the analysis module, wherein the power cell optimizer communicates at least one of the optimization parameter and the at least one target parameter to the semiconductor device simulator, wherein the at least one of the optimization parameter and the at least one target parameter correspond to a simulated behavior;

wherein the semiconductor device simulator performs a simulation of the semiconductor device and generates simulation data in accordance with the simulated device behavior; and wherein the semiconductor device simulator generates a discrete netlist for points in the device layout.

6. The apparatus of claim 5, further comprising a semiconductor device layout generator coupled to receive the simulation data from the semiconductor device simulator and to generate a semiconductor layout representation corresponding to the simulated device behavior having the improved characteristic.

7. The apparatus of claim 6, wherein the semiconductor device comprises a power cell including an LDMOS transistor having an RDSon characteristic, wherein the at least one target parameter comprises an area of the transistor, and wherein the improved characteristic comprises an RDSon-Area product, wherein an optimized RDSon-Area product is smaller in magnitude than a non-optimized RDSon-Area product.

* * * * *